US012706512B2

(12) United States Patent
Skalski et al.

(10) Patent No.: US 12,706,512 B2
(45) Date of Patent: Aug. 11, 2026

(54) SYSTEMS AND METHODS FOR ROTOR SHAFT GROUNDING

(71) Applicant: Ford Global Technologies, LLC, Dearborn, MI (US)

(72) Inventors: Vincent T Skalski, Plymouth, MI (US); Shailesh Kozarekar, Novi, MI (US); Brian Richard Light, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 18/448,750

(22) Filed: Aug. 11, 2023

(65) Prior Publication Data

US 2025/0055357 A1 Feb. 13, 2025

(51) Int. Cl.
*H02K 11/40* (2016.01)
*H02K 5/15* (2006.01)

(52) U.S. Cl.
CPC ............... *H02K 11/40* (2016.01); *H02K 5/15* (2013.01)

(58) Field of Classification Search
CPC ......... H02K 11/40; H02K 13/003; H02K 5/15
See application file for complete search history.

(56) References Cited

U.S. PATENT DOCUMENTS

| | | | |
|---|---|---|---|
| 4,515,417 A | 5/1985 | Shiraishi | |
| 8,183,727 B2 | 5/2012 | Fee et al. | |
| 9,859,672 B2 | 1/2018 | Fukumoto | |
| 2007/0093341 A1* | 4/2007 | Supina | B60K 6/46 475/5 |
| 2019/0081538 A1* | 3/2019 | Nye | H01R 39/025 |

FOREIGN PATENT DOCUMENTS

| | | | |
|---|---|---|---|
| CN | 208461597 U * | 2/2019 | |
| DE | 102005045960 A1 | 4/2007 | |
| DE | 102020203162 A1 | 9/2021 | |
| DE | 102021208058 B3 | 11/2022 | |
| JP | 2020533934 A | 11/2020 | |
| WO | WO-2021174080 A1 * | 9/2021 | H02K 16/025 |

OTHER PUBLICATIONS

WO-2021174080-A1, all pages (Year: 2021).*
CN-208461597-U, all pages (Year: 2019).*
Chatterton, S. et al., "Electrical pitting of tilting-pad thrust bearings: Modelling and experimental evidence," Tribology International, vol. 103, Nov. 2016, 12 pages.

* cited by examiner

*Primary Examiner* — Naishadh N Desai
(74) *Attorney, Agent, or Firm* — McCoy Russell LLP

(57) ABSTRACT

Methods and systems for grounding a rotor of an electric machine. The electric machine system includes a rotor shaft, a grounding cover coupled to an end of the rotor shaft, and a cam aligned with a rotational axis of the rotor shaft and electrically coupled to the grounding cover. The electric machine system further includes an end plate of a housing and a spring extending between the cam and an interior surface of the housing, where the grounding cover, the cam, and the spring are electrically conductive.

19 Claims, 4 Drawing Sheets

200

214
202
220
204
208
310
314
212
306
308
313
330
227
324
334
322
320
336
318
206
221
226
316
222
326
224
328
302
312
210
304
218

SYSTEMS AND METHODS FOR ROTOR SHAFT GROUNDING

FIELD

The present description relates generally to methods and systems for grounding a rotor shaft of an electric machine.

BACKGROUND/SUMMARY

Some previous electric motors, such as traction motors, impart current into components such as rotor bearings. This current discharge has the potential to lead to electrical pitting of the rotor bearings, thereby decreasing the motor's longevity.

Attempts have been made to ground rotors of electric motors. One example approach is shown by Shiraishi in U.S. Pat. No. 4,515,417 A, where a contactor is used in an attempt to reduce electrolytic corrosion of the bearings. The contactor is radially aligned and retracts during motor operation. However, the inventors herein have recognized potential issues with Shiraishi's system as well as other grounding systems. The contactor in the motor may be prone to degradation. Further, the inventors have recognized that it may be desirable to enable current discharge from the rotor during motor operation. Brushes used in other grounding devices may also be prone to undesirable degradation.

In one example, the issues described above may be at least partially addressed by an electric machine system that includes a rotor shaft, a grounding cover coupled to an end of the rotor shaft, and a cam aligned with a rotational axis of the rotor shaft and electrically coupled to the grounding cover. The alignment of the cam with the rotational axis of the rotor shaft reduces degradation of the cam and/or the grounding cover that results from relative movement between the cam and grounding cover. The electric machine system further includes an end plate of a housing and a spring extending between the cam and an interior surface of the housing, where the grounding cover, the cam, and the spring are electrically conductive. As such, the grounding cover, the cam, and the spring create a path for electrical current to discharge from the rotor to the housing reducing the amount of (e.g., and in some cases eliminating) electrical current that discharges through bearings of the electric machine during machine operation where the rotor is rotating. Consequently, the longevity of the bearings is increased. Further, the spring functions to self-center the cam, thereby decreasing the relative movement of the cam in relation to the grounding cover, thereby reducing wear in the grounding system and specifically the cam. Therefore, the longevity of the machine is further increased. Further, using a cam in the grounding system allows the longevity of the system to be increased when compared to grounding assemblies that make use of brushes.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for grounding a rotor of an electric machine. While in use, the electric machine imparts an electrical current in the rotor which may cause arc pitting, electromagnetic interference, and/or electromagnetic compatibility challenges. In order to overcome these challenges, a grounding system is used to discharge electrical current from the rotor to a housing of the electric machine. The grounding system includes a grounding cover, a grounding cam, and a grounding spring, each of which are aligned with the rotational axis of the rotor. As such, the grounding cam and grounding cover experience a decreased amount of movement, relative to each other, during machine operation. In this way, the grounding system is able to discharge electrical current from the rotor while reducing wear on grounding system components. Specifically, the use of a cam in the grounding system allows wear between the cam and the grounding cover to be reduced due to a reduction in friction when compared to a grounding brush.

Figure 1:
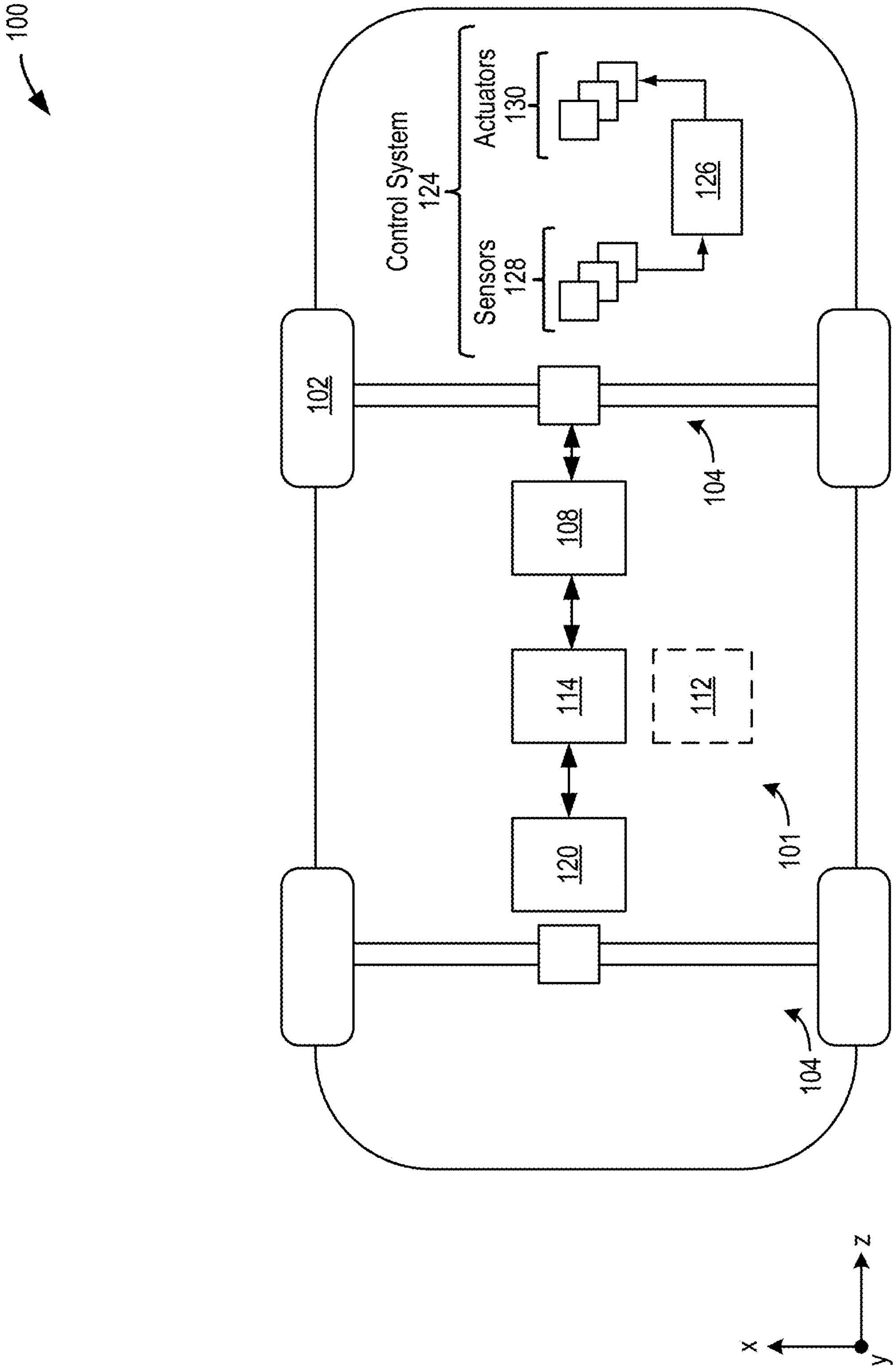
FIG. 1 shows a vehicle including an electric drivetrain.
Figure 2:
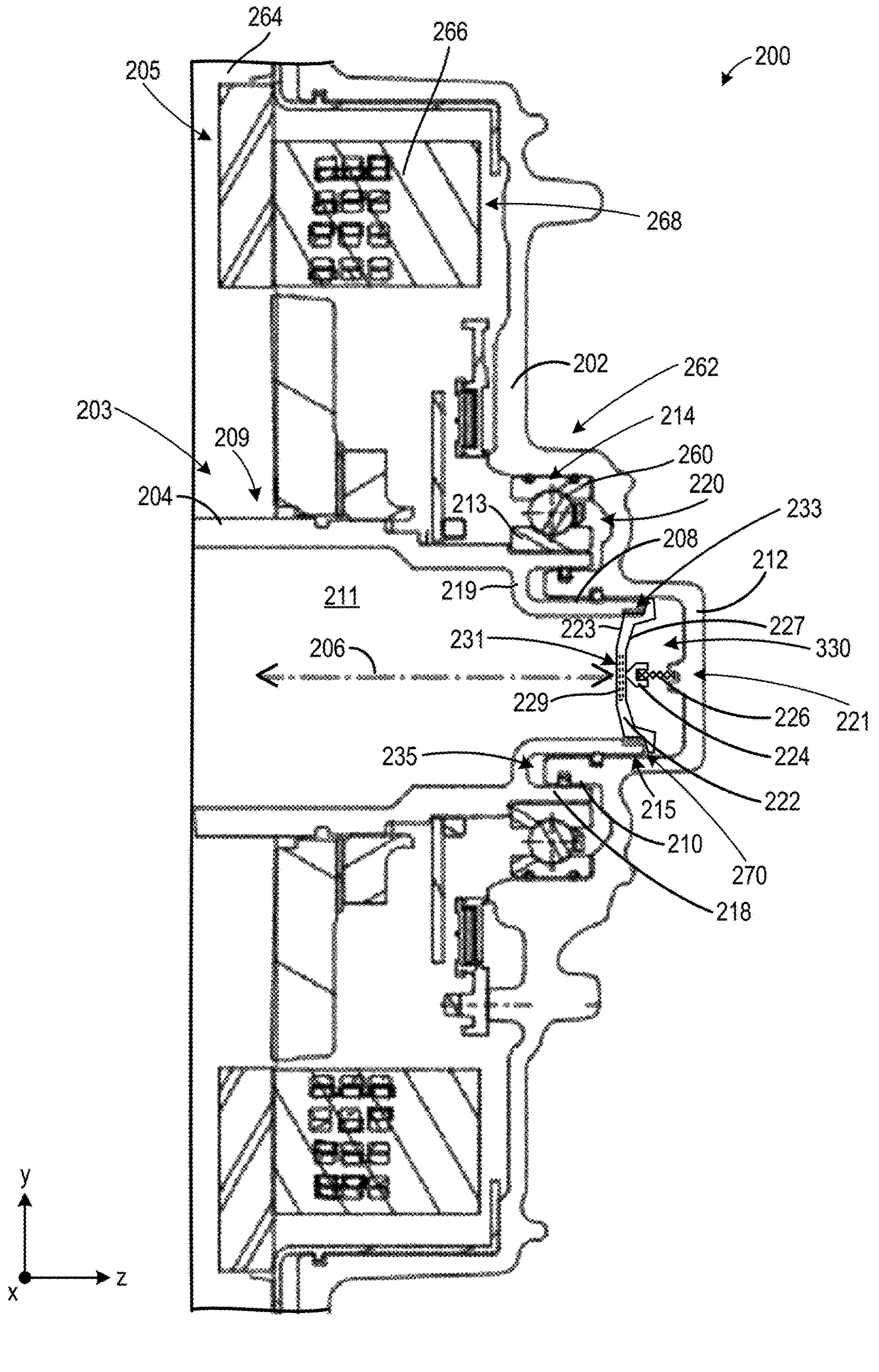
FIG. 2 shows an electric machine including a rotor and a grounding system.
Figure 3:
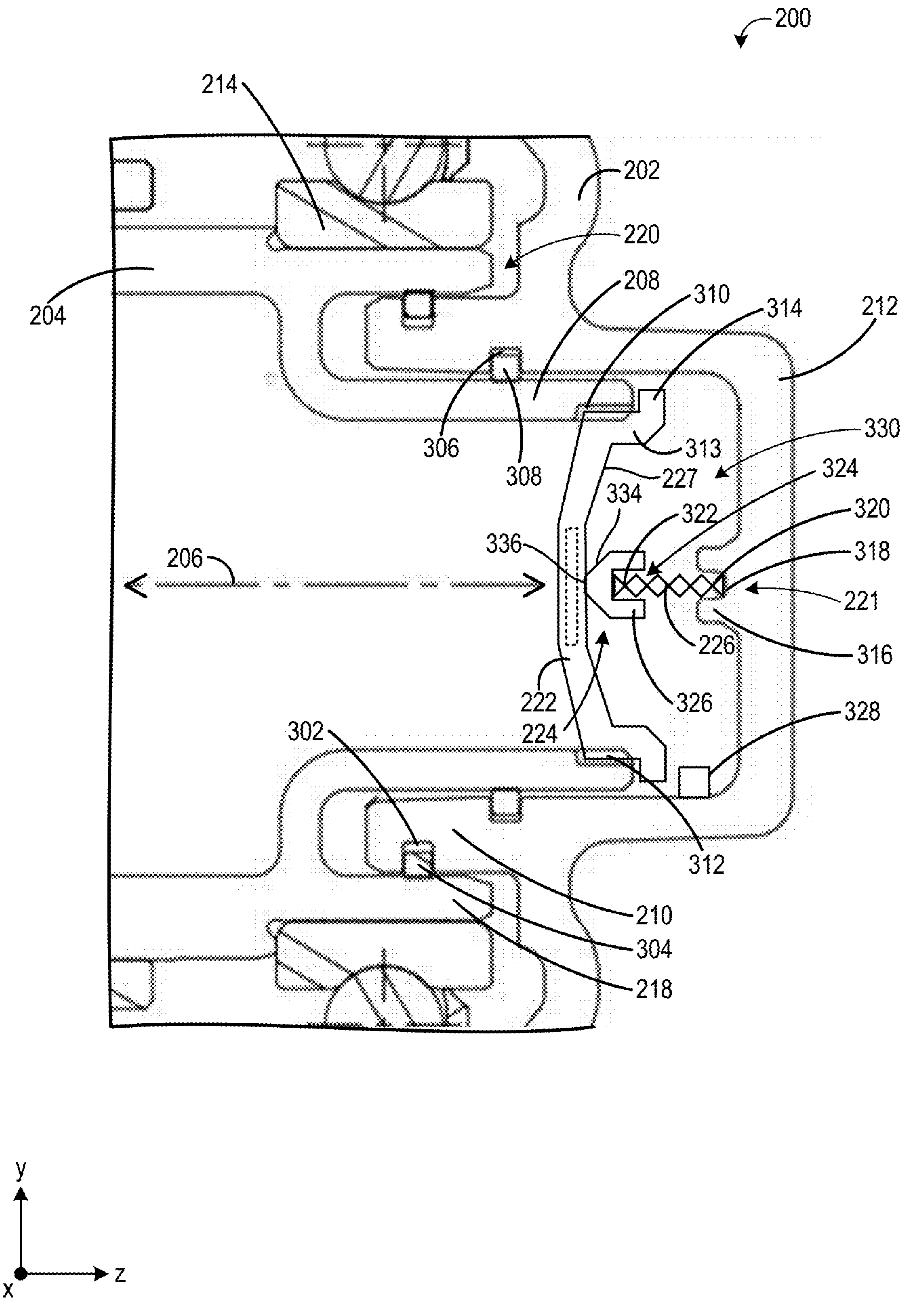
FIG. 3 shows a detailed view of the rotor and the grounding system of FIG. 2.
Figure 4:
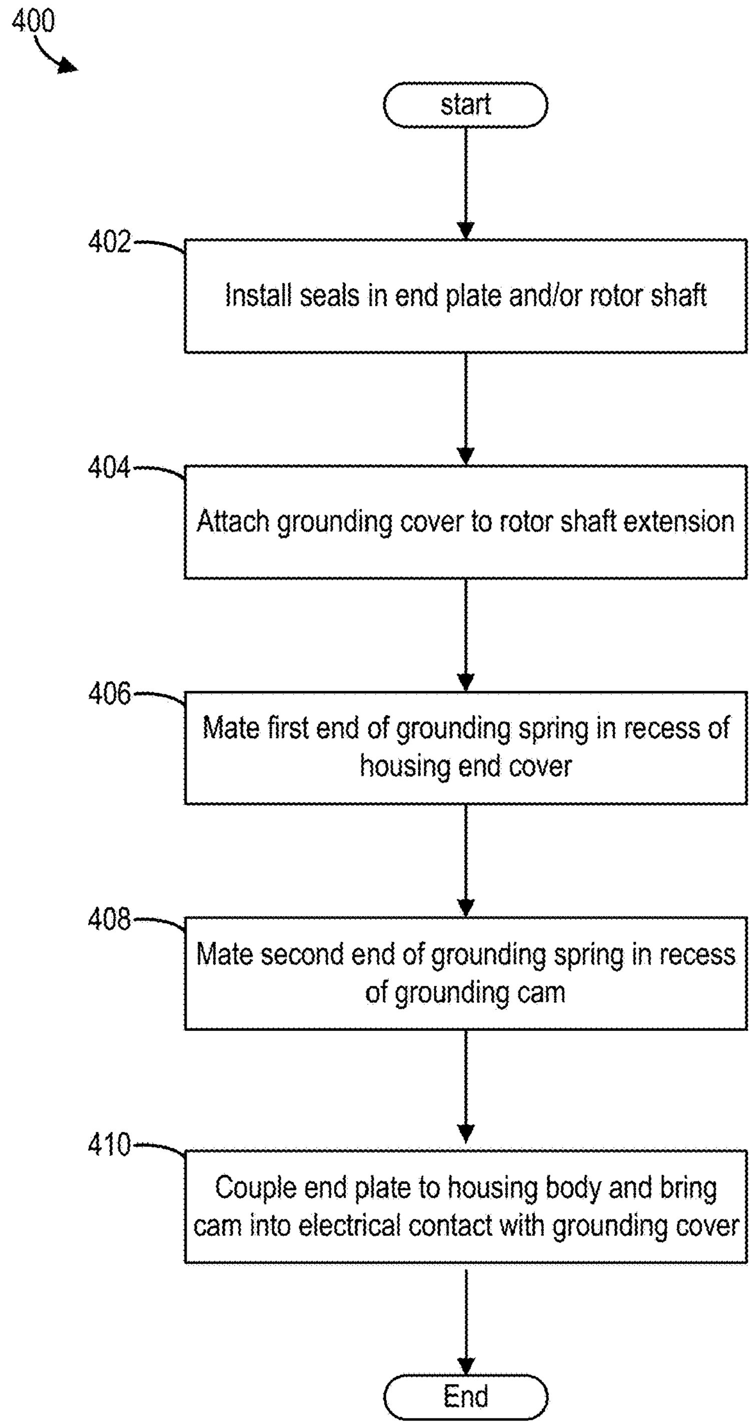
FIG. 4 shows a method for assembling a grounding system on a rotor of an electric machine.

In some examples, the electric machine may be included within a vehicle, as shown in FIG. 1. As such, the electric machine may provide motive power to one or more drive wheels of the vehicle and/or provide mechanical power to other suitable vehicle components. As illustrated in FIGS. 2 and 3, the grounding cover may be positioned at an end of a rotor shaft of the electric machine. Further, the grounding cam may be held in face sharing contact with the grounding cover by force exerted by the grounding spring. A method for installing the grounding system into the electrical machine is illustrated in FIG. 4.

FIGS. 1-3 include a coordinate system to orient the views. The y-axis may be a vertical axis (e.g., parallel to a gravitational axis), the z-axis may be a longitudinal axis (e.g., horizontal axis), and/or the x-axis may be a lateral axis, in one example. However, the axes may have other orientations, in other examples. Further, FIGS. 2 and 3 are drawn approximately to scale, aside from the schematically depicted components. However, the components in the electric machine may have other suitable relative dimensions, in alternate examples.

FIG. 1 illustrates a schematic representation of a vehicle 100 with an electric machine 114 that may be included in a powertrain 101. In such an example, the electric machine 114 may be a traction motor and the vehicle may therefore be an electric vehicle (EV). Additionally or alternatively, the electric machine 114 may be used to provide mechanical power to other suitable vehicle components or may be used in other suitable systems such as manufacturing systems, appliances, industrial systems, and the like. In the EV example, the EV may specifically be an all-electric vehicle, in one example, or a hybrid electric vehicle (HEV) which includes an internal combustion engine 112, in another example. A variety of HEV architectures may be used such as a HEV architecture where the electric machine provides mechanical power to one axle and the engine provides mechanical power to another axle, an HEV architecture where the engine is solely used to recharge an energy storage device 120, an HEV architecture where the engine and motor are coupled in series or parallel, and the like.

The powertrain 101 may include a transmission 108 (e.g., a gear box, gear train, and the like) coupled to one or more of axles 104 of vehicle 100. However, in alternate examples, the transmission may be omitted from the vehicle and the electric machine 114 and/or additional electric machines may provide mechanical power directly to the drive wheels. The transmission 108 may be rotationally coupled to one of the axles 104, as shown in FIG. 1, or to the other axle or both axles, in other examples. The transmission 108 may transfer mechanical power from the electric machine 114 and/or another suitable prime mover to the axles 104 and then to the wheels 102 to propel vehicle 100.

In some examples, the electric machine 114 may be a motor-generator, with a capacity to convert electrical energy into mechanical energy and vice versa. The electric machine 114 may be electrically coupled to the energy storage device 120 (e.g., a battery such as a traction battery, a capacitor, combinations thereof, and the like) of vehicle 100 to both draw power from the energy storage device and provide electrical energy to be stored at the energy storage device, in different operating modes.

Adjustment of the vehicle (e.g., powertrain) between various modes as well as control of operations within each mode may be executed based on a vehicle control system 124, including a controller 126, as shown in FIG. 1. Controller 126 may be a microcomputer, including elements such as a microprocessor unit, input/output ports, an electronic storage medium for executable programs and calibration values, e.g., a read-only memory chip, random access memory, a data bus, and the like. The storage medium can be programmed with computer readable data representing instructions (e.g., computer readable instructions) executable by a processor for performing the methods described below as well as other variants that are anticipated but not specifically listed.

Controller 126 may receive various signals from sensors 128 coupled to various regions of vehicle 100. For example, the sensors 128 may include sensors at the electric machine 114 to measure motor speed and motor temperature, a pedal position sensor to detect a depression of an operator-actuated pedal such a control pedal, speed sensors at the wheels 102, and the like. Upon receiving the signals from the various sensors 128 of FIG. 1, controller 126 processes the received signals, and employs various actuators 130 of vehicle 100 to adjust vehicle operations based on the received signals and computer readable instructions stored on the memory of controller 126. For example, controller 126 may receive an indication of depression of a pedal, signaling a desire for increased vehicle speed. In response, the controller 126 may command an increase in the speed of the electric machine 114. Additionally, the controller 126 may command operation of the electric machine 114 as a generator to recharge the energy storage device 120.

FIG. 2 illustrates an electric machine 200 in cross-section, which may be a non-limiting example of the electric machine 114 of FIG. 1. Therefore, in some examples, the electric machine 200 may provide power to a transmission of a vehicle. In still other examples, the electric machine 200 may be included in another suitable system, as indicated above. The cutting plane for the cross-sectional view depicted in FIG. 2 as well as FIG. 3 extends through the machine's rotational axis 206.

As illustrated in FIG. 2, the electric machine 200 includes a rotor 203 with a rotor shaft 204 and a stator 205. The stator 205 generates a magnetic field (e.g., a rotating magnetic field) that acts on the rotor 203, and causes the rotor shaft 204 to rotate within the electric machine 200 during a mode of machine operation where the machine generates a rotational output. The rotor shaft 204 rotates around the rotational axis 206 which may be referred to as a central axis. The rotational axis 206 is a longitudinal axis of the rotor 203 and may be parallel with the z-axis.

The rotor shaft 204 may include a shaft extension 218, which extends outward along the z-axis. The electric machine 200 may further include a bearing cavity 220 with the bearing 214 therein. The bearing cavity 220 may specifically be a wet cavity, and, in such an example includes a fluid, such as oil, in some examples, contained therein and/or circulated therethrough. It will be appreciated that another bearing may be coupled to an opposing end of the rotor shaft 204.

Further, the shaft extension 218 is in contact with the bearing 214 and specifically an inner race 213 of the bearing. An outer race 260 of the bearing 214 may be in contact with a section 262 (e.g., a stepped section) of an end plate 212 of a housing 202. The housing 202 may form an enclosure for the stator 205 and the rotor 203. To elaborate, the end plate 212 may be coupled to a housing body 264. Further, the end plate 212 may form at least a portion of an end winding cavity 266 which may have stator end windings 268 positioned therein. In one example, the end winding cavity 266 may be in fluidic communication with the bearing cavity 220. Alternatively, in another example, the end winding cavity 266 may be fluidly separated from the bearing cavity 220.

In the illustrated example, the bearing 214 is a ball bearing. However, another suitable bearing such as a roller bearing, a thrust bearing, combinations thereof, and the like may be used in other examples. The bearing 214 may be positioned adjacent to an end 215 of the rotor shaft 204. Further, the bearing 214 supports rotation of the rotor shaft 204 around the rotational axis 206. As such, the shaft extension 218 rotates around the rotational axis 206 within the bearing cavity 220 when the rotor shaft 204 is rotating.

The rotor shaft 204 includes a shaft extension 208, which extends from a body 209 of the rotor shaft along the z-axis. The rotor shaft 204 may be formed as a hollow shaft with a cavity 211 that is interior to the shaft and specifically the body 209, in one example. However, at least a portion of the rotor shaft may have a different profile, in other examples. For example, at least a portion of the rotor shaft may be solid.

In the illustrated example, the shaft extension 208 has a smaller diameter than the shaft extension 218, and as such is positioned closer to the rotational axis 206 than the shaft extension. As such, a portion of the shaft extension 208 may be circumferentially surrounded by the shaft extension 218. Further, the shaft extension 208 may extend axially further outboard from the body 209 of the shaft 204 than the shaft extension 218. Profiling the rotor shaft with these extensions allows the bearing 214 to be positioned in a desired location within the bearing cavity 220 and an end plate extension 210 to be positioned radially inward from the bearing 214 and provide desired sealing functionality in relation to the bearing cavity 220 and a cavity 235 in a grounding system 221 which is discussed in greater detail herein. Further, the shaft extension 208 and/or the shaft extension 218 may have a cylindrical cross-section in the x-y plane formed between the x-axis and the y-axis.

The extension 208 may be coupled to the extension 218 via a radially extending shaft portion 219. Further, a cavity 235 is formed between the extension 208 and the extension

218, in the illustrated example. Further, the end plate extension 210 is mated with the cavity 235, in the illustrated example.

The grounding system 221 provides a path for the discharge of electrical current, and therefore reduces degradation of the bearing 214 caused by arc pitting. Consequently, the machine's longevity and reliability are increased. Further, the grounding system is designed with features such as a grounding cam 224 that experiences decreased wear during operation when compared to other grounding devices such as grounding brushes.

The grounding system 221 includes a grounding cover 222 coupled to the shaft extension 208 (e.g., an end 270 of the shaft extension 208). In some examples, the grounding cover 222 may be interlocked, staked, and/or splined to the shaft extension 208. In this way, the grounding cover is able to be efficiently connected to the rotor shaft during manufacturing. In other examples, the grounding cover 222 may be press-fit or threadingly attached to the shaft extension 208. As such, the grounding cover 222 may rotate in unison with the rotor shaft 204 when the electric machine 200 is spinning the rotor shaft.

At least a portion of the grounding cover 222 is electrically conductive. For instance, the grounding cover 222 may include metallic conduit(s) 229 that extends therethrough and provide a path for electrical current to discharge from the rotor shaft 204 and into the grounding cover. The metallic conduit(s) 229 are schematically depicted in FIG. 2. However, the metallic conduit(s) 229 may have greater structural complexity. For instance, the metallic conduit(s) may extend from a central portion 231 of the grounding cover 222 radially outward to an interface 233 between the cover and the shaft extension 208. In such an example, multiple metallic conduits may extend radially outward in this manner and may be symmetrically arranged with regard to the rotational axis 206. Additionally or alternatively, the material used to construct the body of the grounding cover 222 may be electrically conductive. To elaborate, an outboard surface 227 of the grounding cover 222 may be constructed out of an electrically conductive material that continuously extends to the interface 233 between the grounding cover and the shaft extension 208.

An inboard surface 223 of the grounding cover 222 may form a portion of the boundary of the interior cavity 211 of the rotor shaft 204. The outboard surface 227 of the grounding cover forms a portion of a boundary of a sealed cavity 330, discussed in greater detail herein. The outboard surface 227 of the grounding cover 222 is in electrical contact with the grounding cam 224, which is included in the grounding system 221. In the illustrated example, the grounding cam 224 is in contact with the grounding cover 222 at a point along the rotational axis 206. As such, the grounding cam 224 is aligned with the rotational axis 206. In this way, movement of the grounding cam 224 is reduced while the grounding cover 222 rotates in unison with the rotor shaft 204 during electric machine operation. A reduction of relative movement between the grounding cam 224 and the grounding cover 222 may reduce the amount of wear on (e.g., degradation of) the grounding cam and/or grounding cover.

The grounding cover 222 and the grounding cam 224 may each include low friction material such that friction between the grounding cover and the grounding cam is reduced as the grounding cover rotates against the grounding cam. Further, the grounding cam 224 may be electrically conductive such that the grounding cover 222 and the grounding cam create a path for electrical current to discharge from the rotor shaft 204. The grounding cam may be formed out of copper, metal graphite, combinations thereof, and the like. The portion of the grounding cam 224 that is in contact with the grounding cover 222 may be a tip of the grounding cam, and the grounding cam may become larger (e.g., have a larger diameter) further from the grounding cover.

The grounding system 221 includes a grounding spring 226. The grounding spring 226 is conductive and functions to self-center the grounding cam 224 to reduce relative movement of the cam (e.g., eliminate relative movement of the cam). To elaborate, the grounding spring 226 includes a conductive path that may be formed via wires, the material used to construct the grounding spring, combinations thereof, and the like. The grounding spring 226 may be a coil spring, a wave spring, and the like.

The grounding cam 224 may be held in face sharing contact with the grounding cover 222 by the grounding spring 226. The grounding spring 226 may be positioned between the grounding cam 224 and the end plate 212 of the housing 202. The grounding spring 226 is electrically conductive such that the grounding cover 222, the grounding cam 224, and the grounding spring 226 create a path for electrical current to discharge from the rotor shaft 204, as discussed above. With the grounding spring 226 being mated with the end plate 212, electrical current may discharge from the rotor shaft 204 to the housing 202 by passing through the grounding system 221. In this way, the amount of electrical current that is discharged from the rotor shaft 204 through the bearing 214 may be reduced, and therefore degradation of the bearing may be reduced, when compared to machines which do not include a grounding system. Further, a longitudinal axis of the grounding spring 226 is aligned with the rotational axis 206 of the rotor shaft 204. As such, the grounding spring 226 facilitates centering of the grounding cam 224 with the rotational axis 206.

FIG. 3 illustrates a detailed view of the grounding system 221 positioned to discharge electrical current from the rotor shaft 204 to the housing 202 which allows electrical current that is discharged from the shaft extension 218, through the bearing 214, and into the housing 202 to be reduced or circumvented, in some cases. To elaborate, the grounding system 221 provides a path for electrical current to discharge from the shaft extension 208, through the grounding system, and into the end plate 212 of the housing 202. As such, the grounding system 221 may increase the lifespan of the bearing 214, thereby reducing the amount and/or frequency of electric machine maintenance and servicing and increasing machine longevity.

The end plate 212 of the housing 202 may include the end plate extension 210, as previously discussed. To elaborate, a portion of the end plate extension 210 may be positioned between the shaft extension 218 and the shaft extension 208. The end plate extension 210 may include a recess 302 that may extend around an outer circumferential surface of the end plate extension. Thus, the recess 302 may form an annular recess. The end plate extension 210 may additionally or alternatively include a recess 306, which may extend around an inner circumferential surface of the end plate extension. Thus, the recess 306 may form an inner annular recess. The recess 306 may be positioned closer to the end plate 212, relative to the z-axis, while the recess 302 may be positioned further from the end plate 212.

The shaft extension 218 may include a seal 304 that protrudes inwards (e.g., towards the rotational axis 206) and extends around an inner circumferential surface of the shaft extension. Further, the shaft extension 208 may include a seal 308 that protrudes outwards (e.g., away from the rotational axis 206) and extends around an outer circumferential surface of the shaft extension. The seals 304 and 308 are mated with the recesses 302 and 306, respectively. The seals reduce the chance of fluid traveling between the sealed cavity 330 and the bearing cavity 220 while allowing the rotor shaft to rotate and the housing to remain stationary relative to the rotor shaft. In this way, the chance of debris (e.g., shavings and/or dust) created from wear on the grounding cover 222 and/or the grounding cam 224 mixing with the fluid in the bearing cavity 220 is reduced. By retaining metallic debris from the grounding cover 222 and/or grounding cam 224 within the sealed cavity 330, contamination of the lubrication fluid within the electric machine 200 may be reduced (e.g., prevented). In some examples, the seal 304 may be an O-ring and the seal 308 may be a slip ring. In such an example, the slip ring (e.g., the seal 308) may be press fit about an outer surface of the shaft extension 208. In this way, the sealed cavity 330 may be reliably sealed. However, other suitable types of seals may be used in alternate examples. For instance, the seals may both be slip rings or other suitable seals such as labyrinth seals, lip seals, rotating face seals, and the like.

The grounding cover 222 of the grounding system 221 may be positioned at an end of the shaft extension 208. An outer circumferential edge 312 of the grounding cover 222 may be splined, interlocked, or staked to the recess 310. Further, the grounding cover 222 may include a lip 314. The lip 314 extends outwards (e.g., away from the rotational axis 206) from an extended portion 313 of the grounding cover 222. As such, the lip 314 may be in face sharing with a distal end of the shaft extension 208. In this way, the lip 314 may reduce the amount of debris that comes into contact with the seal 308 (e.g., a slip ring, an O-ring, and the like), in some cases.

The grounding spring 226 includes a first end 320 and a second end 322. The first end 320 may be positioned in a recess 318 of the end plate 212 to axially constrain the spring and allow the spring to compress along the axis 206. The recess 318 may be formed within an extension 316, which may have a cylindrical shape and protrude inwards from a center of the end plate 212 into the sealed cavity 330. The second end 322 of the grounding spring 226 may be positioned in a recess 324 of the grounding cam 224. The recess 324 is formed within a body 326 of the grounding cam 224, which may have a cylindrical shape and extend towards the end plate 212. Arranging the spring in this manner allows the spring to be compressed along the axis 206 and reduces undesirable movement of the spring out of alignment with the axis 206.

The grounding spring 226 may be compressed along the z-axis between the grounding cam 224 and the end plate 212. As such, the grounding spring 226 may exert force on the grounding cam 224, pushing the grounding cam 224 into contact with the grounding cover 222. The force exerted on the grounding cam 224 by the grounding spring 226 may also reduce the chance of the grounding cam moving out of alignment with the axis 206. In this way, degradation of the cam and cover (e.g., the grounding cam 224 and grounding cover 222) caused by misalignment may be reduced.

The electric machine 200 may include a collection mechanism 328 positioned within the sealed cavity 330. The collection mechanism 328 collects debris that is produced via the grounding cover 222 rotating against the grounding cam 224. As such, the collection mechanism 328 may reduce the chance of the debris degrading the seals 304 and 308. As such, the sealed cavity 330 may remain sealed and debris may be kept out of the oil or other suitable fluid that is present in the bearing cavity 220 and around the bearing 214. In some examples, the collection mechanism 328 may be a magnet that attracts metallic dust, shavings, etc. from the grounding cam 224 and/or the grounding cover 222. Further, the collection mechanism 328 may be positioned in a lower portion of the sealed cavity 330 to allow the metallic dust and shavings to travel to the mechanism by way of gravity. In this way, the metallic dust, shaving, etc. may be collected to reduce the chance of the metallic material migrating to unwanted areas of the machine. However, the collection mechanism may be positioned in other suitable locations, in alternate examples.

The grounding cam 224 may include a tip 334 which axially extends from the body 326 and include a face 336 (e.g., a planar face) that contacts the outboard surface 227 of the grounding cover 222. The tip 334 may be tapered in an inboard direction along an axis that is parallel to the z-axis. Constructing the grounding cam 224 in this manner allows the grounding cam to achieve increased durability.

FIG. 4 illustrates a method 400 for assembling a grounding system onto a rotor shaft of an electric machine. The method 400 may be used to assemble the grounding system in the electric machine depicted in FIGS. 2 and 3, in one example. At least a portion of the method steps may be at least in part automatically implemented via manufacturing devices which may include instructions for the method steps. The instructions may be stored in memory that is executable by a processor of a controller. Still further, at least a portion of the method steps may be manually implemented via manufacturing personnel, in some instances.

At 402, the method 400 includes installing seals in the end plate and/or the rotor shaft. To elaborate, one seal may be mated in a recess of the end plate while another seal is press-fit onto a rotor shaft extension.

At 404, the method 400 includes attaching a grounding cover to an extension of a rotor shaft of the electric machine. For instance, the grounding cover may be splined, interlocked, and/or staked to second extension of the rotor shaft. Further, the grounding cover is electrically conductive, creating a path for electrical current to discharge from the rotor shaft and into the grounding cover.

At 406, the method 400 includes mating a first end of a grounding spring into a recess of a housing end plate. The housing end plate may include an annular extension that protrudes into the sealed cavity, with a recess positioned at a center of the extension. The recess may be cylindrical, and may accommodate a first end of the grounding spring. By accommodating the first end of the grounding spring, the recess may reduce undesirable movement of the grounding spring and maintain the alignment of the grounding spring with the rotational axis of the rotor shaft.

At 408, the method 400 includes mating a second end of the grounding spring into a recess of a grounding cam. The grounding cam may include a circular extension with a recess positioned at a center of the circular extension. The recess may be circular, and may accommodate a second end of the grounding spring. The grounding spring may exert a force on the grounding cam, which pushes the grounding cam into contact with the grounding cover once fully assembled.

At 410, the method 400 includes coupling the end plate to a housing body and bringing the cam into electrical contact with the grounding cover. For instance, the end plate extension may be mated with a recess formed between two rotor shaft extensions. The grounding cam may be centered on the grounding cover, such that a contact point between the grounding cam and the grounding cover is positioned along the rotational axis of the rotor. In this way, undesirable movement of the grounding cam relative to the grounding cover may be reduced as the grounding cover rotates with the rotor. Consequently, degradation of the grounding cover and/or the grounding cam is reduced. The grounding spring and the grounding cam are both electrically conductive, and as such create a path with the grounding cover for electrical current to discharge from the rotor shaft and into the grounding spring. To expound, the grounding cover, the grounding cam, and the grounding spring now provide a path for discharging electrical current from the rotor to the housing. As such, bearings of the electrical machine may experience less electrical discharges from the rotor and therefore have increased longevity.

In this way, systems and methods are proposed for grounding a rotor of an electric machine. Contact between the stationary grounding cam and the rotating grounding cover is created at, or very close to, the rotational axis of the grounding cover to reduce translational motion of the grounding cam. A spring mechanism, with a conductive path built in, is included to facilitate self-centering of the grounding cam, thereby reducing any relative movement. The material chosen for the interface performs with ultra-low wear and good conductivity. Further, a sealed chamber is created by press fitting a slip ring and an O-ring on the rotor shaft, which separates a wet cavity from the sealed chamber containing the grounding cam and the grounding spring, and reduces the amount of metallic dust, shavings, etc. that may enter the wet cavity. A collection mechanism (e.g., a magnet) for potential wear dust is positioned in the chamber such that it does not affect the seal. As such, the possible wear (due to small potential movement of the grounding cam) is contained in a sealed cavity.

The technical effect of the methods described herein is to efficiently ground a rotor of an electric machine with a grounding cover, a grounding cam, and a grounding spring.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example, an electric machine system is provided that includes a rotor shaft, a grounding cover coupled to an end of the rotor shaft, a cam aligned with a rotational axis of the rotor shaft and electrically coupled to the grounding cover, an end plate of a housing, and a spring extending between the cam and an interior surface of the housing, where the grounding cover, the cam, and the spring are electrically conductive. In a first example of the system, the cam may include a recess that mates with an end of the spring. In a second example of the system, optionally including the first example, the grounding cover may be splined to the rotor shaft. In a third example of the system, optionally including one or both of the first and second examples, the grounding cover may be interlocked to the rotor shaft. In a fourth example of the system, optionally including one or more of each of the first through third examples, the grounding cover may be staked to the rotor shaft. In a fifth example of the system, optionally including one or more of each of the first through fourth examples, the grounding cover may include a metallic conduit that extends therethrough. In a sixth example of the system, optionally including one or more of each of the first through fifth examples, the housing may include an inwardly protruding portion that includes a recess, and an end of the spring may be mated with the recess. In a seventh example of the system, optionally including one or more of each of the first through sixth examples, the grounding cover and the housing may form a sealed cavity. In an eighth example of the system, optionally including one or more of each of the first through seventh examples, the system may further include a magnet positioned in the sealed cavity. In a ninth example of the system, optionally including one or more of each of the first through eighth examples, the electric machine system may be a traction motor.

In another example, a method for operation of an electric machine system is provided that includes rotating a rotor shaft while the rotor shaft is electrically grounded, where the electric machine system includes the rotor shaft, a grounding cover coupled to an end of the rotor shaft, a cam aligned with a rotational axis of the rotor shaft and electrically coupled to the grounding cover, and a spring extending between the cam and an interior surface of a housing, where the grounding cover, the cam, and the spring are electrically conductive. In a first example of the method, the grounding cover and the housing may form a sealed cavity and the electric machine system may further include a seal that is positioned between the rotor shaft and the housing.

In yet another example, an electric motor is provided that includes a rotor shaft, a grounding cover coupled to an end of the rotor shaft, a cam electrically coupled to the grounding cover, an end plate of a housing, and a spring extending between the cam and an interior surface of the end plate and aligned with a rotational axis of the rotor shaft, where the spring and the cam are aligned with a rotational axis of the rotor shaft, and where the grounding cover, the cam, and the spring are electrically conductive. In a first example of the electric motor, the end plate may include a radially extending protrusion that has an inner surface with a first groove which has a first seal positioned therein and an outer surface with a second groove which has a second seal positioned therein, and the first seal and the second seal may contact an extension of an end of the rotor shaft. In a second example of the electric motor, optionally including the first example, the grounding cover may be splined, interlocked, and/or staked to the rotor shaft. In a third example of the electric motor, optionally including one or both of the first and second examples, the grounding cover may be positioned outboard of a rotor shaft bearing. In a fourth example of the electric motor, optionally including one or more of each of the first through third examples, the grounding cover and the end plate may form a sealed cavity. In a fifth example of the electric motor, optionally including one or more of each of the first through fourth examples, the electric motor may further include a collection device positioned in the sealed cavity. In a sixth example of the electric motor, optionally including one or more of each of the first through fifth examples, the collection device may include a magnet. In a seventh example of the electric motor, optionally including one or more of each of the first through sixth examples, the spring may include a first end mated with a first recess in the cam, and a second end mated with a recess in an inwardly protruding section of the end plate.

Note that the example assembly routines included herein can be used with various system configurations. The assembly methods and routines disclosed herein may be stored as executable instructions in non-transitory memory and may be carried out by a manufacturing system including the controller in combination with various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the manufacturing system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims will be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine system, comprising:
a rotor shaft;
a grounding cover coupled to an end of the rotor shaft;
a cam coaxially aligned with a rotational axis of the rotor shaft and electrically coupled to the grounding cover;
an end plate of a housing; and
a spring extending between the cam and an interior surface of the housing;
where the grounding cover, the cam, and the spring are electrically conductive;
where the rotational axis extends through a face of the cam and the spring; and
where the face of the cam is in face sharing contact with a portion of the grounding cover through which the rotational axis extends.

2. The electric machine system of claim 1, where the cam includes a recess that mates with an end of the spring.

3. The electric machine system of claim 1, where the grounding cover is splined to the rotor shaft.

4. The electric machine system of claim 1, where the grounding cover is interlocked to the rotor shaft.

5. The electric machine system of claim 1, where the grounding cover is staked to the rotor shaft.

6. The electric machine system of claim 1, where the grounding cover includes a metallic conduit that extends therethrough.

7. The electric machine system of claim 1, where:
the housing includes an inwardly protruding portion that includes a recess; and
an end of the spring is mated with the recess.

8. The electric machine system of claim 1, where the grounding cover and the housing form a sealed cavity.

9. The electric machine system of claim 8, further comprising a magnet positioned in the sealed cavity.

10. The electric machine system of claim 1, where the electric machine system is a traction motor.

11. A method for operation of an electric machine system, comprising:
rotating a rotor shaft while the rotor shaft is electrically grounded;
where the electric machine system includes:
the rotor shaft;
a grounding cover coupled to an end of the rotor shaft;
a cam coaxially aligned with a rotational axis of the rotor shaft and electrically coupled to the grounding cover; and
a spring extending between the cam and an interior surface of a housing;
where the grounding cover, the cam, and the spring are electrically conductive;
where the rotational axis extends through the cam and the spring; and
where the face of the cam is in face sharing contact with a portion of the grounding cover through which the rotational axis extends.

12. The method of claim 11, where the grounding cover and the housing form a sealed cavity and the electric machine system further comprises a seal that is positioned between the rotor shaft and the housing.

13. An electric motor, comprising:

a rotor shaft;

a grounding cover coupled to an end of the rotor shaft;

a cam electrically coupled to the grounding cover;

an end plate of a housing; and a spring extending between the cam and an interior surface of the end plate and aligned with a rotational axis of the rotor shaft;

where the spring and the cam are aligned with a rotational axis of the rotor shaft;

where the grounding cover, the cam, and the spring are electrically conductive; and where the spring includes:

a first end mated with a first recess in the cam; and a second end mated with a recess in an inwardly protruding section of the end plate.

14. The electric motor of claim 13, where:

the end plate comprises a radially extending protrusion that has an inner surface with a first groove which has a first seal positioned therein and an outer surface with a second groove which has a second seal positioned therein; and the first seal and the second seal contact an extension of an end of the rotor shaft.

15. The electric motor of claim 13, where the grounding cover is splined, interlocked, and/or staked to the rotor shaft.

16. The electric motor of claim 13, where the grounding cover is positioned outboard of a rotor shaft bearing.

17. The electric motor of claim 13, where the grounding cover and the end plate form a sealed cavity.

18. The electric motor of claim 17, further comprising a collection device positioned in the sealed cavity.

19. The electric motor of claim 18, where the collection device includes a magnet.

* * * * *